United States Patent [19]

Knurek et al.

[11] Patent Number: 4,687,188
[45] Date of Patent: Aug. 18, 1987

[54] MOUNT FOR CONTROLLING OR ISOLATING VIBRATION

[75] Inventors: Thomas A. Knurek; Terry L. Houston, both of Auburn; Gary L. Hipsher, Logansport, all of Ind.

[73] Assignee: Cooper Tire & Rubber Company, Findlay, Ohio

[21] Appl. No.: 825,825

[22] Filed: Feb. 4, 1986

[51] Int. Cl.⁴ .................. B60G 15/04; F16F 15/04; B32B 31/06; F16M 13/00
[52] U.S. Cl. ................... 267/140.1; 248/562; 264/261; 264/275; 267/35; 267/195
[58] Field of Search ............ 267/8 R, 8 B, 8 C, 8 D, 267/8 A, 9 R, 9 B, 9 A, 9 C, 10, 57.1 R, 57.1 A, 63 R, 63 A, 140.1, 152, 153, 120; 180/300; 29/458, 511, 526 R; 264/261, 275; 248/562, 636, 609, 638

[56] References Cited

U.S. PATENT DOCUMENTS

| | | | |
|---|---|---|---|
| 3,147,964 | 9/1964 | Wolf | 267/63 R |
| 3,642,268 | 2/1972 | Hipsher | 267/57.1 R |
| 3,643,320 | 2/1972 | Werner | 29/526 X |
| 3,698,703 | 10/1972 | Hipsher | 267/63 R |

FOREIGN PATENT DOCUMENTS

| | | | |
|---|---|---|---|
| 115174 | 8/1984 | European Pat. Off. | 248/562 |
| 2360857 | 6/1975 | Fed. Rep. of Germany | 267/152 |
| 2394715 | 1/1979 | France | 267/8 R |
| 59-37348 | 2/1984 | Japan | 267/140.1 |

Primary Examiner—Andres Kashnikov
Assistant Examiner—Robert J. Oberleitner
Attorney, Agent, or Firm—Biebel, French & Nauman

[57] ABSTRACT

An isolating mount, such as for an engine, comprises a rigid bushing with a resilient rubber block molded around it and cavities formed in the block opening to its exterior on opposite sides of the bushing, preferably located along a plane parallel to the longitudinal axis of the bushing. End plates are bonded to the block surrounding the open ends of the cavities, and these plates may have flanges thereon coated with rubber. Optional floor plates may be incorporated in the block at the bottoms of one or both cavities. Covers are held in sealed relation over the cavities, as by forming the flanges around the covers to retain them. A passage is formed between the cavities, and the cavities and passage are filled with a liquid which is confined therewithin. Displacement of the block in response to forces acting on the mount will result in distortion of the cavities and corresponding displacement of the liquid from one of the cavities to the other to damp motion of the block. A rigid outer body surrounds the block and exerts a compressive force thereon primarily in a direction along the plane through the cavities. The flanges have their rubber coating in contact with the interior of the outer body, thus there is a rigid to resilient material interface between the bushing and the block, and a second rigid to resilient material interface between the block and the outer body of the mount.

24 Claims, 13 Drawing Figures

MOUNT FOR CONTROLLING OR ISOLATING VIBRATION

CROSS-REFERENCE TO RELATED APPLICATION

This application contains disclosure related to a co-pending application Ser. No. 829,676 filed Feb. 14 1986 and assigned to the same entity as this application.

BACKGROUND OF THE INVENTION

This invention relates to a mount used for connecting two members while isolating and/or controlling the transfer of motion, and particularly motion due to vibration, between these members. Mounts of the general type are described in U.S. Pat. Nos. 3,147,964, 3,642,268, and 3,698,703.

The earlier type of mount disclosed in said U.S. Pat. No. 3,147,964, utilizes primarily the directed energy absorbing characteristics of a rubber-metal interface to impede the transmission of vibration between two members, and also to provide a certain mount of shock isolation in the mounting of one mechanical member to another, while still mechanically connecting the members as desired. These members can be any of a vast variety of devices such as different parts of mechanisms or vehicles, supports for machinery, and packaging supports for large masses. Of particular interset are the connections of chassis power train and body parts in vehicles. For example, the mounting of an engine in an automobile requires control and isolation in six different degrees of freedom, namely motion along X, Y and Z axes and rotation about these axes, i.e. roll, pitch and yaw axes. In this area of application alone, the modern demands for vibration control/isolation and adequate support and anchoring present sophisticated mount design requirements which are aggravated by the need to accomodate some degree of misalignment which is to be expected in mass production systems.

The aforementioned '268 and '703 patents disclose such mounts wherein the vibration isolating effect of a resilient (such as rubber) member coupled between the members is modified by the placement of a damping liquid in cavities located on opposite sides of and within the resilient member. These cavities are connected through a passage which limits the flow of the liquid between the cavities, thus damping the motion of the resilient member along a plane extending through the two cavities.

With respect to such fluid damped mounts, the metal to rubber bonds in those devices are of the post-bonded type, which means that the bond is formed by assembling separate rubber and metal parts, with an adhesive therebetween which is later thermally activated to provide a bond between these parts. Various types of such bonding are discussed in those patents. In many applications of mounts such a bond is not reliable from a physical adhesion standpoint, and may also have discontinuities which alter the desired continuous metal-rubber bond that is needed.

It is also recognized in the art that a good bond between the rigid (e.g. metal) parts in such mounts introduces an impedance mis-match into the mechanical system which is effective in minimizing the transmission of noise or vibration energy across this bond. Each such interface in the path along which vibrational energy can be directed will substantially damp the vibration and provide additional isolating capacity. Thus, it is desirable to maximize the use of such interfaces as much as possible without compromising the over-all mechanical design of a mount.

SUMMARY OF THE INVENTION

The present invention provides such an isolating mount for connecting two parts, such as supporting an engine or other machine, wherein a rigid tubular bushing has a resilient rubber block molded around the bushing and cavities are formed in the block, opening to its exterior on opposite sides of said bushing and located along a first plane parallel to the longitudinal axis of the bushing. Rigid (such as metal) end plates are bonded to the block and surround the open ends of the cavities, and the end plates have flanges thereon which may be coated with rubber material. Covers are held in sealed relation to the exterior of said block over said cavities, for example by forming the flanges around the covers to retain them in sealing relation over the cavities. These covers may be steel plates, which may be rubber coated, or non-metallic corrosion resistant plates formed of glass fiber filled resin. A passage is formed between the cavities, either molded into the block, subsequently formed therein, or located outside said block. The cavities and passage are filled with a suitable liquid which is confined within the cavities and passage. Displacement of the bushing in response to forces acting on the mount will result in distention of the cavities and corresponding displacement of the liquid from one of the cavities to the other to damp repeated displacements of the block.

The foregoing provides a subassembly with sealed in damping capability, ready to be incorporated into a completed mount. A rigid (such as steel) outer body is formed around the subassembly so as to exert a compressive force thereon. If desired this force may be selective, for example primarily in a direction along a plane through the cavities and bushing. The flanges have their rubber coating in contact with the interior of the outer body, thus there is a rigid to rubber interface between the bushing and the block, and a second rubber to rigid interface between the block and the outer body of the mount. Means are provided for coupling the bushing to one of two members to be isolated, such as an engine, and a means is also provided for attaching the outer body to the other of the two members, such as an engine compartment wall.

Forces acting through the mount, between the outer body and the internal bushing, will tend to compress the rubber of the block, which in turn will rebound, and if the forces are oscillatory in nature, this action may be vibratory. In a direction sideways through the bushing, the rubber of the mount is the primary restraint to such action, while in a direction generally vertically through the mount, the hydraulic action of the liquid in the cavities provides a damping of the motion due to displacement of the fluid and inherent damping of the rubber. It is desirable that this action be controlled, or isolated in the case of vibrations. Various vibrations in automotive applications will be encountered in the range of 1 to 1000 Hertz, for example.

An important advantage of mounts built according to the invention is the capability to accommodate off-center or off-axis loading. Of necessity certain mount installations, such as the engine mounts of an automobile, must be capable of accommodating a wide variety of static and dynamic forces such as static load, operational vibration, torque and road surface vibrations and impacts. In designing a mount installation for a specific purpose such as an automobile engine mount, it is imperative that the relative magnitude of each of the variety of static and dynamic forces be considered in conjunction with the directional orientation of each such force and its resulting motion.

The optimal result of support, load bearing and damping of a mount such as disclosed in this application will be achieved by orienting the mount on the centerline (or plane) along which the major static and dynamic forces, and the relative motion resulting therefrom, are expected to occur. A distinct advantage of the mounts disclosed in this application is the unique demonstrated ability to functionally control (support and dampen) static and dynamic forces and the relative motion resulting therefrom, at angles in the order of 40° to 45° displaced from the optimum centered alignment. Taking into consideration the normal dimensional tolerance experienced in mass production of large machinery, and also considering the fact that in the case of modern engine installation (particularly in passenger automobiles) the compartment structure may flex considerably under various loads and stresses, it can be appreciated that this accomodation characteristic of the present mount provides significant advantages.

The present invention also provides a method for manufacturing such a hydraulically damped mount which results in improved bonding of rubber to rigid (e.g. metal) interfaces, which makes the assembly, filling and pre-loading of the mount adaptable to production line techniques, and which results in a mount that has improved tolerance to off-axis loads. This results in greater design adaptability of the mount, and minimizes the need for close tolerances in its installation.

Accordingly, the primary object of the present invention is to provide a novel hydraulically damped mount as above described, which mount is characterized by its simplicity of manufacture, its multiple rigid-to-rubber interfaces which maximize high frequency vibration isolation, and its capability to function effectively under conditions where the loads imposed on the mount are substantially offset from the optimal orientation of the mount structure; to provide such a mount in which selective pre-loading can easily be introduced; to provide such a mount in which the damping action of the hydraulic circuit can be matched to desired design conditions; to provide such a mount in which the interaction of the central bushing and the rubber of the block tending to change the volumetric capacity of the mount cavities can be varied if desired; and to provide a unique method of manufacturing such mounts.

Other objects and advantages of the invention will be apparent from the following description, the accompanying drawings and the appended claims.

DESCRIPTION OF THE PREFERRED EMBODIMENT

Referring to the drawings, a mount constructed in accordance with a preferred embodiment of the invention is intended to accomodate and control motion between two parts over six different degrees of freedom. For an understanding of the following description, the transverse axis is designated X—X in FIG. 7, the longitudinal axis is designated Y—Y shown in FIG. 6, and the vertical axis is designated Z—Z in FIG. 7. Mounts provided by the invention control motion along planes containing these axes, and also control motion in rotation about such axes.

Figure 1:
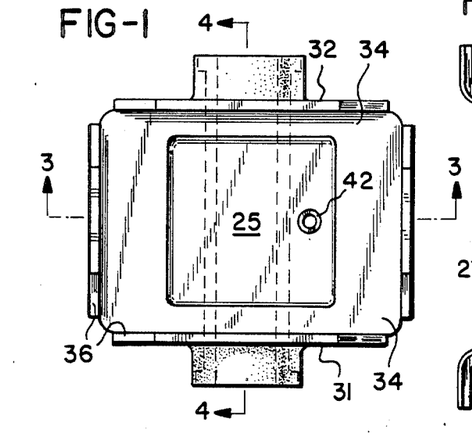
FIG. 1 is a plan view of the central assembly of an isolating mount according to the invention.
Figure 2:
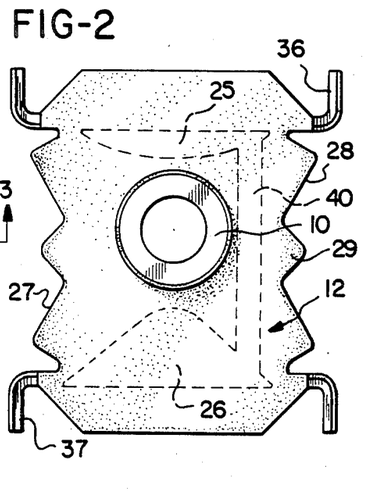
FIG. 2 is a side elevation view of the central assembly as shown in FIG. 1.
Figure 3:
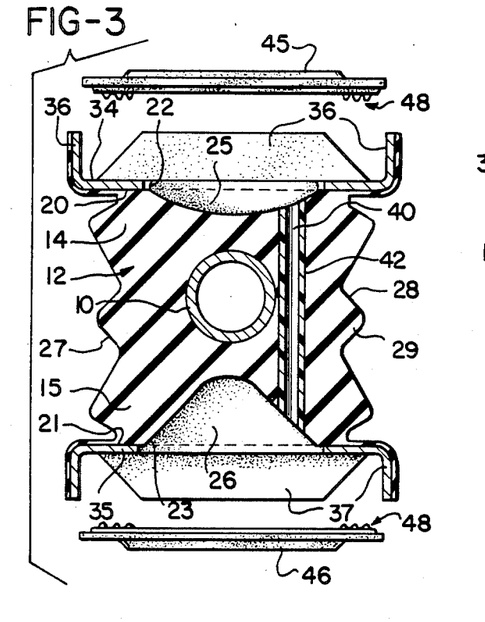
FIG. 3 is a cross-sectional view taken along line 3—3 in FIG. 1, with covers shown in position for attachment.

The mount provided by the present invention has a central assembly which includes a rigid (such as steel) tube 10 or bushing around which is molded, and bonded to the tube, a resilient mass or block 12 of rubber or equivalent resilient material. The characteristics of the rubber will depend upon the use for which a mount is designed. By way of example, for engine mounts natural rubber with a Durometer in the range of 40 to 70 is used, in other applications the Durometer may be higher or lower. The tube 10 is intended to have its longitudinal axis parallel to, or coincident with, the Y—Y axis of the installed mount. The top 14 and bottom 15 of the block 12 have generally parallel relatively flat surfaces 20 and 21 with openings 22 and 23 therein which define the outer open boundaries of a pair of cavities 25 and 26 molded into the block. These cavities are located opposite (top and bottom) the tube or bushing 10, preferably but not necessarily centered along a plane which bisects the longitudinal axis of the tube, and which contains the Z—Z axis.

The sides 27 and 28 of the block transverse to the X—X axis are formed to a selected contour, usually being mirror images of each other. In general, the "hour glass" shape illustrated provides desired resistance of the mount to displacement of the tube 10 and the block along the transverse or X—X axis of the mount. The central outwardly extending rib on these sides, indicated at 29, provides bumpers which will contact rigid mount structure (as later described), should such displacement be excessive, and thereby introduce compression resistance of the block material to such excessive movement. The other or fore/aft sides 31 and 32 of the block 12 are essentially flat, but with the ends of the tube or bushing 10 protruding therefrom. If desired, the sides 31 and 32 may also be contoured to introduce controlled resistance along the Y—Y axis and/or to modify the spring rate along the Z—Z axis.

Figure 4:
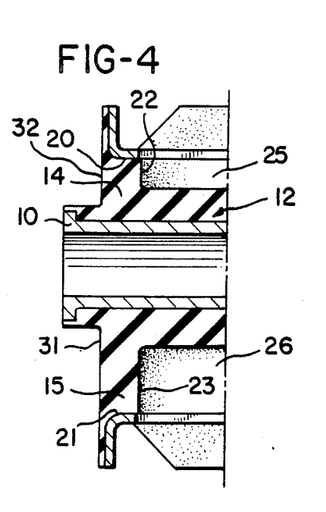
FIG. 4 is a partial cross-sectional view taken along line 4—4 in FIG. 1.

The top and bottom 14 and 15 have respective plates 34 and 35 (referred to hereafter as end plates) molded and thus bonded thereto, with central openings that coincide with the openings 22 and 23, and with outwardly extending flanges 36 and 37 on their respective perimeters. A connecting passage 40 is formed, offset from tube 10, to connect the cavities 25 and 26, and optionally a rigid tube 42 of predetermined inner diameter can be fitted into this passage to provide control of its opening during operation of the mount, at which time the resilient material of the block will be distorted or distended.

Covers 45 and 46 are provided as rubber coated rigid (e.g. metal) plates onto which are molded seal lips or rings 48. The covers are sized to fit within the top and bottom plates, being insertable within the flanges 36,37 to fit in sealing relation over the openings 22 and 23. These covers may be molded rubber parts with a simple steel stamping incorporated during molding. They are intended to be clamped into tight sealing relation with the top and bottom end plates 34, 35 and the adjacent portions of the block, to which these plates are bonded, in order to close the cavities 25 and 26.

Figure 5:
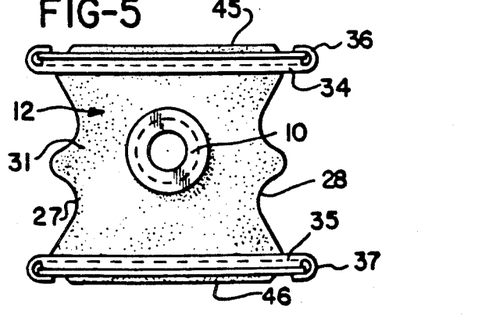
FIG. 5 is a side elevational view of the central assembly with the covers attached.

Before this is accomplished, the cavities and the connecting passage are filled with a suitable damping liquid of predetermined density. Ethylene glycol or glycerine are typical liquids used for this purpose. The flanges 36 and 37 are then tightly formed around the edges of the covers to complete the central assembly, as shown in FIG. 5. It should be noted that rubber material may be bonded around the surfaces of the flanges 36,37 and thus create a rubber surface facing outwardly of the subassembly.

This assembly is then placed between two complementary parts 51 and 52, formed of steel or the like and intended to be rigidly joined as by rivets 53 to form a rigid outer body on the completed mount. The top to bottom dimension 54 (FIG. 7) within the part 52 is less than the top to bottom outer dimension of the central assembly (FIG. 5) by and amount which is calculated to require a predetermined compression of the central assembly along the Z—Z axis to bring the parts 51 and 52 into contact, after which these aprts are then joined into an effectively integral outer body or shell. The sides 27 and 28 are relieved, however, and may not contact the outer body part 52 under normal static conditions as shown in FIG. 7.

The outer body, therefore, exerts a selective compressive force upon the central assembly, and particularly upon the resilient block or mass 12, along the Z—Z axis longitudinally bisecting the tube 10. The ends of the outer body are essentially open, having flanges 57 and 58 formed from the body parts 51 and 52, to retain the central assembly but leaving the ends of tube 10 free to move within the limits permitted by the constraints on the block 12 and the resistance of that block to external forces acting on the tube while the outer body is confined or held. The flanges 57,58 must at the minimum be of sufficient dimension to restrain all movement of the end plates 34,35 within the outer body along the Y—Y axis. The flanges 57,58 may be extended toward bushing 10 so as to provide a restraining surface that will cooperate with a suitably contoured surface on the ends 31,32 thereby providing controlled resistance to motion along the Y—Y axis and/or control of spring rate along the Z—Z axis. Furthermore, the outward facing coating of rubber on the flanges 36,37 provides a metal to rubber interface between the subassembly and the outer body at their contacting locations, contributing to the isolation capability of the mount since there are three complete rubber/metal interfaces between the tube or bushing 10 and the outer body or shell of the mount.

Figure 6:
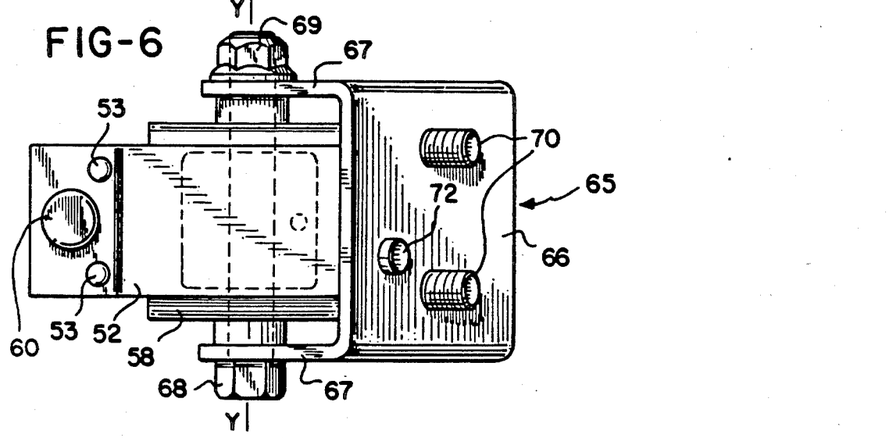
FIGS. 6 and 7 are top and side elevational views, respectively, showing the completed isolating mount and an attached coupling bracket.
Figure 7:
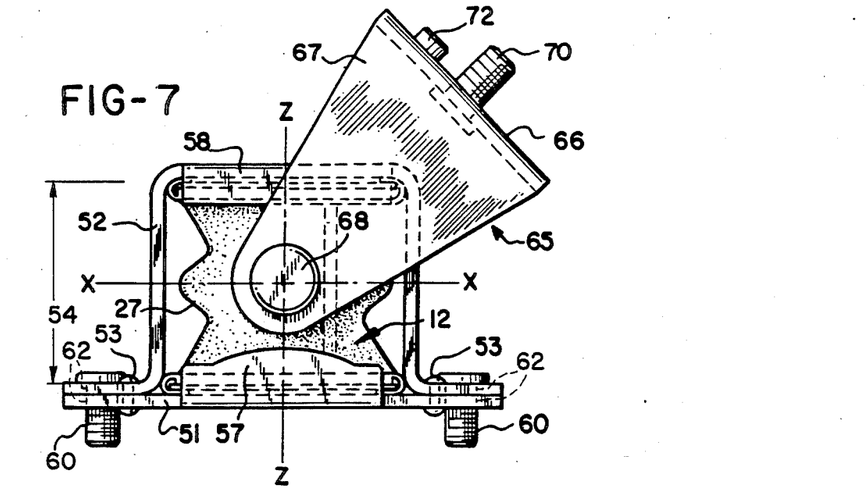

Referring to FIGS. 6 and 7, the outer body is provided with suitable support or coupling means for attaching it to one of two members (not shown) to be coupled and vibrationaly isolated. For example, appropriate mounting bolts 60 extend through holes 62 formed in the overlapping attached parts of the members 51 and 52. The size and location of these bolts and corresponding holes may vary for any particular design. A mounting bracket in the form of a clevis 65, having a base part 66 and outwardly extending arms 67, is attached to the tube 10 by a through bolt 68 which is secured with a locking nut 69. This arrangement may allow some rotation of the clevis around the axis of the tube, or this connection may be rotationally rigid, as by use of non-circular tube and bolt, an intervening key or similar means, depending upon the requirements of the particular use and installation of the mount. The base 66 of the clevis is provided with attaching bolts 70 and may include an orienting or alignment pin 72; the bolts 70 might for example be used to attach the clevis to the other member of the pair, such as to a mounting pad on an engine block.

It should be noted by comparing FIGS. 2 and 5 with FIG. 7 that the longitudinal axis of bushing 10 may be originally offset upward from the X—X and Y—Y axes. The reason for this is to design the mount for a predetermined static load, such as its portion of engine weight. Thus when the subassembly is built, the bushing is displaced upward from the ultimate Y—Y axis alignment, and when the mount is in place (assumed in FIG. 7) the static load on the mount will result in the bushing axis and the Y—Y axis coinciding.

One of the advantages of a mount built according to the invention is its capability to accommodate off-center or off-axis loading. Of necessity, certain mount installations such as the engine mounts of an automobile, must be capable of accommodating a wide variety of static and dynamic forces such as static load, operational vibration, torque and road surface vibrations and impacts. In designing a mount installation for a specific purpose such as an automobile engine mount, it is imperative that the relative magnitude of each of the variety of static and dynamic forces be considered in conjunction with the directional orientation of each such force and its resulting motion.

The optimal result of support, load bearing and damping of mounts disclosed in this application will be achieved by orienting the placement of the mount to located the Z—Z axis on the centerline (or plane) along which the major static and dynamic forces and the relative motion resulting therefrom is expected to occur. A distinct advantage of the mounts disclosed in this application is the unique demonstrated ability to functionally control (support and dampen) static and dynamic forces and the relative motion resulting therefrom, at angles in the order of 40° to 45° displaced from the optimum Z—Z axis. Taking into consideration the normal dimensional tolerance experienced in mass production of large machinery, and also considering the fact that in the case of modern engine installation (particularly in automobile construction) the compartment structure may flex considerably under various loads and stresses, it can be appreciated that this accomodation characteristic of the present mount provides significant advantages.

Figure 8:
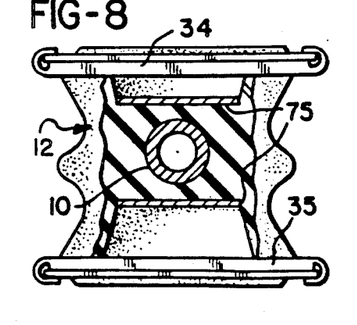
FIG. 8 is a view similar to FIG. 5 showing a modified form of the invention.
Figure 9:
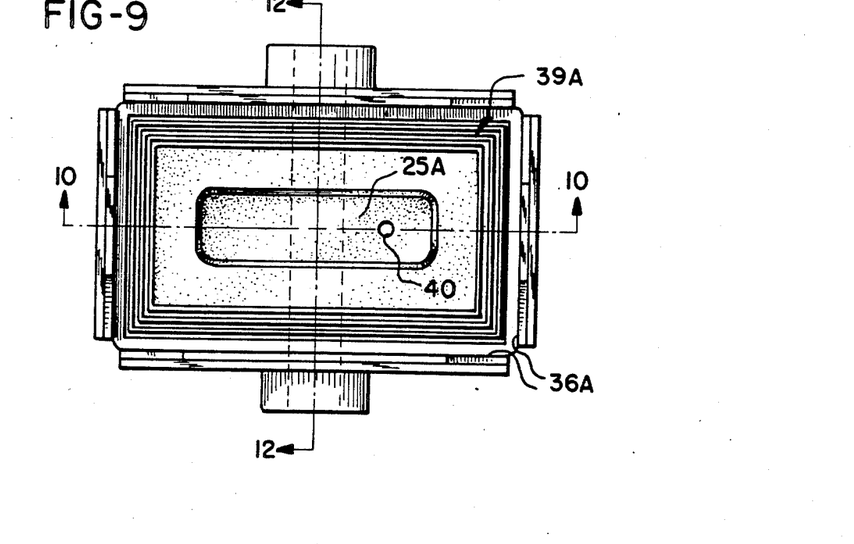
FIG. 9 is a plan view of the central assembly of another design of mount according to the invention.
Figure 10:
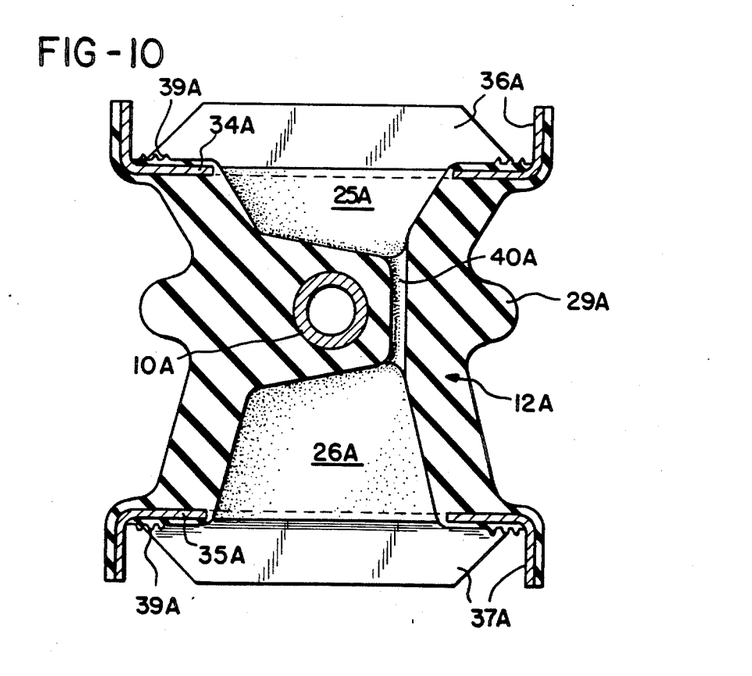
FIG. 10 is a cross-sectional view, taken along line 10—10 in FIG. 9, of the central assembly shown in FIG. 9.
Figure 11:
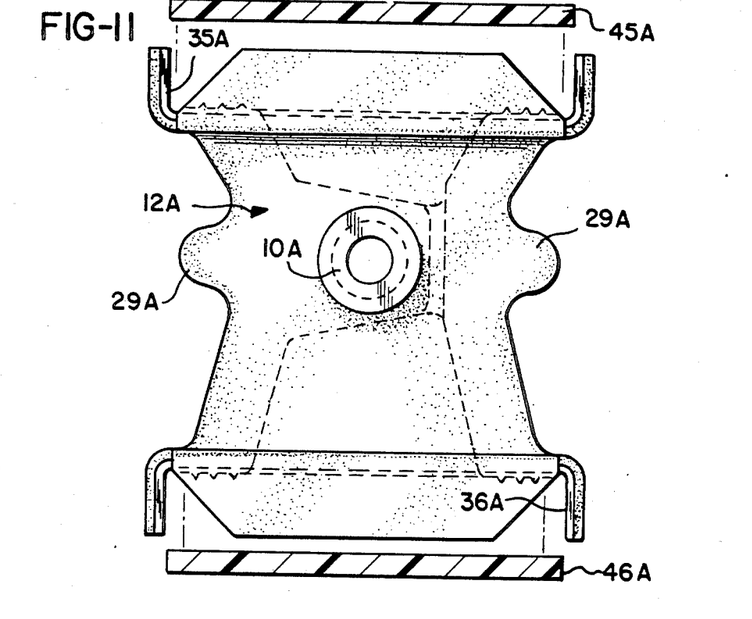
FIG. 11 is a side elevational view with covers shown in position for attachment.
Figure 12:
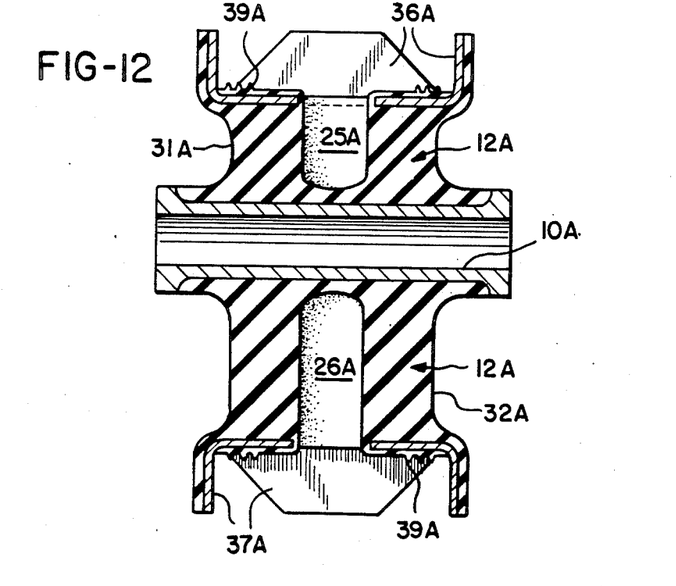
FIG. 12 is a cross-sectional view taken along line 12—12 in FIG. 9.

FIG. 8 discloses a modification of the mount described above, in which rigid (such as metal) floor plates 75 are embedded into the block of resilient material at one or more strategic locations between the central bushing 10 and the cavities 25 and/or 26. Forces tending to displace the bushing, and thus acting to distort the rubber of the block, will tend to distort the floor area or bottom of these cavities. For example, an upward force on bushing 10 will cause the rubber above it to move upward, forming a generally upward convex bulge in the bottom of cavity 25, and similarly a downward force or force component on the bushing will cause a similar change in the shape of cavity 26. In certain designs, this could result in unwanted changes in the volume of one or both of these cavities, and placement of the floor plates 75 as shown will distribute the localized forces from bushing movement, to minimize cavity distortion, or at least to direct such distortion to other parts of the cavity walls where the effect is more tolerable.

The purpose of the plate is to minimize cavity distortion, increase fluid flow thereby increasing damping. This could also be done by adding horizontal flanges on bushing (10) thus increasing the floor area.

FIGS. 9-12 illustrate another form of mount according to the invention and which includes a different cover structure as well as a somewhat different construction of the resilient rubber block. Since many of the parts are essentially the same, like reference numerals with the suffix A have been used, and the description of FIGS. 1-4 is applicable also as to FIGS. 9-12 except where noted hereafter.

Covers 45A and 46A are formed of a corrosion resistant material such as a glass fiber filled resin, and sized to fit within the top and bottom plates, being insertable within the flanges 36A,37A to fit in sealing relation over the openings 22A and 23A, and to be clamped into tight sealing relation with the top and bottom plates and the adjacent portions of the block, to which these plates are bonded, in order to close the cavities 25A and 26A. For this purpose, the openings may have molded into them one or more sealing ribs 39A against which the covers will be pressed.

In addition the floor or bottom areas of the cavities are sloped somewhat, in a generally converging fashion as shown, and the entrances of the passage 40A in to the cavities is flared to avoid the configuration of a sharp orifice at these points, and to facilitate the flow of liquid into and out of the passage.

Figure 13:
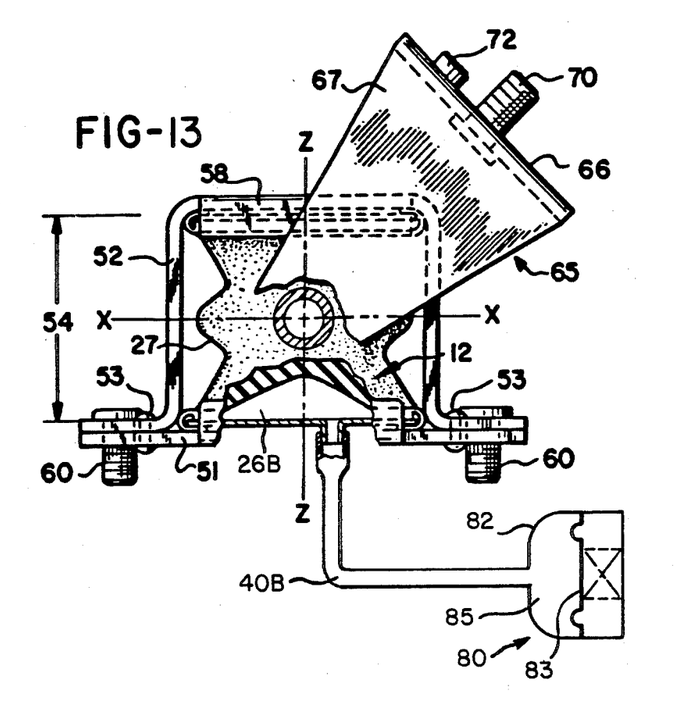
FIG. 13 illustrates a further embodiment of the invention.

In some mounts embodying the present invention it may not be desireable to include two cavities within the resilient block of the mount. It is possible to achive hydraulic damping primarily in one direction, using only a single cavity as shown in FIG. 13. Again, like parts are designated by the same reference numerals, here with the suffix B. The upper cavity is omitted, and the lower cavity 26B is connected through an external passage tube 40B to an accumulator type of device 80 which includes a housing 82 having an internal diaphragm or blader 83 that forms one wall of a closed chamber 85. The other end of tube 40B is connected to chamber 85, and the side of the bladder 83 opposite chamber 85 is exposed to force from a suitable source (not shown) such as predetermined fluid or spring pressure, tending to reduce the volume of chamber 85. Thus the hydraulic damping circuit in this type of mount will comprise the internal mount chamber 26B, passage or tube 40B, and the chamber 85.

The present invention also provides a method of fabricating a viabration controlling/isolating mount which can be readily adapted to economical mass production. Referring again to FIGS. 1-7, the tube or bushing 10 and the end plates 34,35 can be formed by straightforward turning and stamping operations, and these can be supported in a mold for making the block 12, thus bonding these metal parts to the rubber block during the rubber molding step. The molding is done under pressure, and the metal parts can be appropriately covered with rubber which is firmly bonded thereto and cured, forming a precision part which also has good corrosion resistance. The covers 45,46 can be formed as simple metal plate stampings and covered with rubber or similar material in a standard molding process, however a preferred cover is built as a glass fiber (or equivalent) resinous plast molded part which has adequate strength and can be manufactured in one step.

It is possible to form the passage 40 as part of the block molding process, however the location and dimensions of this passage are of some criticallity, and drilling this passage as by using a laser, may be preferred. The tube 42 (if used) can easily be bonded into or inserted in the passage 40 by a simple automated mechanism.

The upper and lower covers 45,46 can be inserted into flanges 36,37 without clamping them, to permit some leakage during a subsequent filling step, in which an appropriate liquid is pumped into the cavities to fill them and the cross passage. For example, the parts can be immersed in the liquid and the block compressed and allowed to rebound several times, before the flanges are formed around the edges of the covers 45,46. This displaces any air in the cavities, then the upper and lower flanges 36,37 can be turned or crimped inward over the edges of the covers 45,46 to complete the subassembly, as shown in FIG. 5. This crimping step may be formed while the parts are immersed in the liquid, thus assuring that the subassembly is fully filled with the liquid as it is closed and sealed.

The subassembly can then be placed within the body part 52, the other body part 51 pressed against part 52 (or vice-versa) and these parts joined as by riveting to complete the mount. Various forms of mounting arrangements can then be provided, according to the needs of a particular application of the mount.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An isolating mount comprising
   a rigid bushing,
   a resilient mass surrounding said bushing,
   said mass including means defining cavities on opposite sides of said bushing located along a first plane extending longitudinally through said bushing,
   means defining a passage between said cavities, said passage being of substantially laser cross-section than said cavities,
   a quantity of liquid filling said cavities and said passage, a rigid outer body contacting said mass and exerting compressive force thereon only in a direction substantially along said first plane, whereby motion of said tube by displacement of said mass is restricted to a substantially greater extent along said first plane than in other directions within said body, cover means held in sealed covering relation to said cavities whereby said liquid is confined within said cavities and said passage, and displacement of said mass in response to forces acting on the mount along said first plane will result in distention of said cavities and corresponding displacement of said liquid from one of said cavities to the other through said passage, means for coupling said bushing to one of two members to be isolated yet connected to each other, and means for attaching said outer body to the other of the two members.

2. A mount as defined in claim 1, wherein
said mass has greater thickness along a second plane perpendicular to said first plane and also extending through said bushing.

3. A mount as defined in claim 1, wherein
said mass has essentialy flat top and bottom surfaces with openings therein defining an open boundary of each of said cavities,
said cover means including cover plates pressed into sealing relation around said open boundaries of said cavities, and
said rigid body pressing against said mass only along said flat surfaces to place said mass in compression.

4. A mount as defined in claim 1, wherein
said mass has essentialy flat top and bottom surfaces parallel to each other and with openings therein defining an open boundary of each of said cavities,
said cover means including cover plates pressed into sealing relation around said open boundaries of said cavities, and
said rigid body being a rectangular member pressing against said mass only along said flat sides to place said mass in compression along the direction of said first plane.

5. A mount as defined in claim 4, including
top and bottom end plates bonded to said top and bottom surfaces respectively and having outwardly directed flanges defining a space surrounding said open boundaries of said cavities,
said cover means comprising rigid plates sized to fit within said spaces
sealing means surrounding the open boundaries of said cavities and cooperating with said end plates and said covers, and
said flanges being formed around the edges of said covers to enclose and seal said cavities.

6. A mount as defined in claim 5, wherein
the resilient material of said mass extends over and is bonded to said flanges, whereby the resilient material on said flanges provides an interface between said end plates and said outer body.

7. A mount as defined in claim 6, wherein said covers are rubber covered metal plates.

8. A mount as defined in claim 6, wherein said covers are a non-metallic corrosion resistant material.

9. A mount as defined in claim 1, wherein said bushing, said mass, and said cover means comprise an internal subassembly of said mount, and
resilient means interfaced between said subassembly and said outer body.

10. A mount as defined in claim 1, including at least one floor plate incorporated in said mass between said bushing and one of said cavities to distribute force exerted through said bushing and tending to displace said mass over a substantial area of said one cavity.

11. An isolating mount comprising
a rigid tubular bushing,
a resilient rubber block molded around said bushing,
said block including means defining cavities opening to the exterior of said block on opposite sides of said bushing located along a first plane parallel to the longitudinal axis of said bushing,
means defining a passage between said cavities, said passage being of substantially lesser cross-section than said cavities,
a quantity of liquid filling said cavities and said passage,
a rigid outer body contacting said block and exerting compressive force thereon primarily in a direction substantially along said first plane,
means for coupling said bushing to one of two members to be connected to each other through the mount and means for attaching said outer body to the other of the two members whereby said bushing and said block may be subjected to forces tending to cause relative movement between them in directions generally along said first plane, and
cover means held in sealed relation to the exterior of said block over said cavities whereby said liquid is confined within said cavities and said passage and displacement of said block in response to forces acting on the mount will result in distention of said cavities and corresponding displacement of said liquid from one of said cavities to the other through said passage to damp such displacement of said block.

12. A mount as defined in claim 11, including at least one floor plate embedded in said block between one of said cavities and said bushing.

13. A mount as defined in claim 11, wherein
said bushing and said outer body are metallic members,
metallic end plates bonded to said block and surrounding the open ends of said cavities,
said end plates having flanges thereon dimensioned to fit around the perimeter of said cover means,
said flanges being coated with the rubber material integral with said block and being formed around said covers to retain said covers in sealing relation over said cavities and also providing a rubber to metal interface with said outer body.

14. An isolating mount comprising
a rigid bushing,
a resilient rubber block molded around said bushing,
said block having generally rectangular top and bottom walls, symmetrically shaped side walls which are generally parallel to said bushing, and front and back walls through which said bushing protrudes,
said block including means defining cavities opening to the exterior of said block through said top and bottom walls and extending into said block but spaced from said bushing,
end plates molded to said top and bottom walls and having openings surrounding the open ends of said cavities, means defining a passage between said cavities, said passage being of substantially lesser cross-section than said cavities, a quantity of liquid filling said cavities and said passage, a rigid outer body surrounding said block and contacting said end plates but spaced from said side walls and leaving said front and back walls open to the exterior of said outer body at least in the regions surrounding the ends of said bushing, and cover means held in sealed relation to said end plates over said cavities whereby said liquid is confined within said cavities and said passage and distortion of said block in response to forces acting on the mount will result in distortion of said cavities and corresponding displacement of said liquid from one of said cavities to the other through said passage to damp such motion of said block.

15. A mount as defined in claim 14 including bumper means formed on the exterior of said side walls of said block and spaced from said outer body so as to engage said body upon predetermined distorion of said block in directions transverse to said side walls.

16. A mount as defined in claim 14, including at least one floor plate embedded in said block at the bottom of one of said cavities.

17. A mount as defined in claim 14, wherein said bushing, said end plates, and said outer body are metallic members, said end plates having flanges thereon dimensioned to fit around the perimeter of said cover means, said flanges being coated with rubber material and being formed around said covers to retain said covers in sealing relation over said cavities and also providing a rubber to metal interface with said outer body.

18. An isolating mount comprising a rigid bushing, a resilient rubber block molded around said bushing, said block having generally rectangular top and bottom walls, symmetrically shaped side walls which are generally parallel to said bushing, and front and back walls through which said bushing protrudes, said block including means defining at least one cavity opening to the exterior of said block through one of said top and bottom walls and extending into said block but spaced from said bushing, end plates molded to said top and bottom walls, that one of said end plates adjacent said cavity having an opening surrounding the open end of said cavity, means defining a passage leading from said cavity, said passage being of substantially lesser cross-section than said cavity, a quantity of liquid filling said cavity and said passage, a rigid outer body surrounding said block and contacting said end plates but spaced from said side walls and leaving said front and back walls open to the exterior of said outer body at least in the regions surrounding the ends of said bushing, and cover means held in sealed relation to said one end plate over said cavity whereby said liquid is confined within said cavity and said passage and distortion of said block in response to forces acting on the mount will result in distention of said cavity and corresponding displacement of said liquid through said passage.

19. A mount as defined in claim 18, wherein said block contains two cavities located therein in spaced apart relation with respect to each other and to said bushing, and said passage leads from one to the other of said cavities.

20. A mount as defined in claim 18, including a chamber exterior of said block, and said passage leads from said cavity to said chamber.

21. A method of making an isolating mount, comprising the steps of (a) molding a resilient block around a rigid tubular bushing member and incorporating upper and lower mounting plates bonded to the block in spaced relation to the bushing member, the plates having openings leading to separate cavities formed in the top and bottom of said block and the cavities being connected by a small passage;

(b) providing sealing cover plates sized to fit on the mounting plates and to cover the openings in the mounting plates to seal the cavities;

(c) filling the cavities and the passage with a liquid;

(d) then attaching the cover plates to the mounting plates in tightly sealed relation to enclose the liquid within the cavities and to form a central subassembly of the mount;

(e) providing a multi-part rigid outer body having an inner region dimensioned to receive the subassembly but having a lesser dimension than the outer distance between the cover plates on the subassembly;

(f) placing the subassembly within the parts of the outer body and compressing them along a plane extending longitudinally through the tubular bushing member and extending through the cavities and the covers to bring the outer body parts into conformity with the subassembly under compression; and (g) securing the outer body parts together.

22. In a method of making an isolating mount, the steps of (a) molding a block of resilient material around a rigid tubular bushing member and incorporating upper and lower rigid metallic mounting plates bonded to the block and forming cavities of predetermined volume in the block on opposite sides of the bushing member, the mounting plates having openings leading to the cavities;

(b) providing sealing cover plates sized to fit on the mounting plates and to cover the openings in the mounting plates to seal the cavities, said mounting plates including flanges extending therefrom designed to surround edges of the cover plates;

(c) forming a small passage between the cavities;

(d) attaching the cover plates to the mounting plates in tightly sealed relation by bending the flanges about the edges of the cover plates to enclose the cavities and to complete a central subassembly of the mount.

23. The method defined in claim 22, wherein the flanges are covered on their outer sides with the resilient material.

24. The method defined in claim 22, including the additional steps of (e) providing a multi-part rigid metallic outer body having an inner region dimensioned to receive the subassembly but having a lesser dimension than the outer distance between the cover plates on the subassembly;

(f) placing the subassembly within the parts of the outer body and compressing them along a plane extending through the tubular bushing member and extending through the cavities to bring the outer body parts into contact while placing the subassembly under compression; and (g) securing the outer body parts together.

* * * * *

UNITED STATES PATENT AND TRADEMARK OFFICE
CERTIFICATE OF CORRECTION

PATENT NO.  : 4,687,188
DATED       : August 18, 1987
INVENTOR(S) : Thomas A. Knurek et al It is certified that error appears in the above-identified patent and that said Letters Patent is hereby corrected as shown below:

Column 5, line 43, "aprts" should be --parts--

Column 8, line 4, "viabration" should be --vibration--

Column 8, line 65, Claim 1, "laser" should be --lesser--

Signed and Sealed this

Twenty-third Day of February, 1988

Attest:

DONALD J. QUIGG

Attesting Officer

Commissioner of Patents and Trademarks